(12) United States Patent
Arden

(10) Patent No.: US 7,753,346 B2
(45) Date of Patent: Jul. 13, 2010

(54) FREESTANDING FENCE

(76) Inventor: Dennis Arden, 11300 S. 4160 Rd., Claremore, OK (US) 74017

( * ) Notice: Subject to any disclaimer, the term of this patent is extended or adjusted under 35 U.S.C. 154(b) by 0 days.

(21) Appl. No.: 11/713,052

(22) Filed: Mar. 1, 2007

(65) Prior Publication Data

US 2008/0210919 A1 Sep. 4, 2008

(51) Int. Cl.
*E04H 17/14* (2006.01)
(52) U.S. Cl. .................. 256/64; 256/65.01
(58) Field of Classification Search .......... 256/1, 256/26, 63, 64, 65.01; 404/6, 9
See application file for complete search history.

(56) References Cited

U.S. PATENT DOCUMENTS

| | | | | |
|---|---|---|---|---|
| 310,555 | A * | 1/1885 | Brevoort | 256/63 |
| 406,642 | A * | 7/1889 | Frost | 256/40 |
| 801,942 | A * | 10/1905 | Warner et al. | 256/32 |
| 1,838,151 | A * | 12/1931 | Penote | 256/64 |
| 2,855,183 | A | 10/1958 | Moore | |
| 3,767,167 | A | 10/1973 | Rasmussen | |
| 3,910,560 | A | 10/1975 | Goetz | |
| 3,921,585 | A | 11/1975 | Hall | |
| 4,145,030 | A * | 3/1979 | Ingraham | 256/1 |
| 4,145,031 | A | 3/1979 | Baker, II | |
| 4,172,427 | A * | 10/1979 | Kindred | 440/15 |
| 4,339,114 | A | 7/1982 | Deike | |
| 4,682,761 | A * | 7/1987 | Hanneken | 256/36 |
| 4,763,879 | A * | 8/1988 | Wasicek et al. | 256/36 |
| 4,860,996 | A * | 8/1989 | Robbins, III | 256/10 |
| 4,889,322 | A * | 12/1989 | Wagner | 256/36 |
| 5,063,876 | A * | 11/1991 | Harris | 119/513 |
| 5,150,484 | A * | 9/1992 | Whitten, Jr. | 5/9.1 |
| 5,301,910 | A | 4/1994 | Lang et al. | |
| 5,318,258 | A | 6/1994 | Lang | |
| 5,722,642 | A | 3/1998 | Bradshaw | |
| 5,732,527 | A * | 3/1998 | Schneider | 52/749.1 |
| 5,738,342 | A * | 4/1998 | Van Winkle | 256/65.02 |
| 5,930,932 | A * | 8/1999 | Peterson | 42/94 |
| 6,126,147 | A * | 10/2000 | Fingerson et al. | 256/64 |
| 6,257,559 | B1 | 7/2001 | Mouri | |
| 6,745,414 | B2 * | 6/2004 | Zhou | 4/599 |
| 6,866,252 | B2 * | 3/2005 | Pulliam | 256/40 |
| 7,048,474 | B2 * | 5/2006 | Tabler | 405/302.7 |

FOREIGN PATENT DOCUMENTS

JP 02004300742 A * 10/2004

* cited by examiner

*Primary Examiner*—Michael P Ferguson
*Assistant Examiner*—Nahid Amiri
(74) *Attorney, Agent, or Firm*—Molly D. McKay

(57) ABSTRACT

A freestanding fence constructed of square tubing and a few connectors. The fence is supported on footed x-shaped posts that sit on top of the ground. A horizontal member extends between adjacent x-shaped posts and a footed vertical support member is provided on each horizontal member approximately midway between the adjacent x-shaped posts. Several fence wires extend horizontally and connect to adjacent x-shaped posts along the length of the fence via electrical insulators and non-conductive fasteners so that the fence can be electrified. The horizontal members attach to the posts by means of couplings that allow for both vertical and horizontal adjustment. The fence is constructed of easily transported and assembled pieces that can be disassembled, moved, and then reassembled as often as needed.

3 Claims, 6 Drawing Sheets

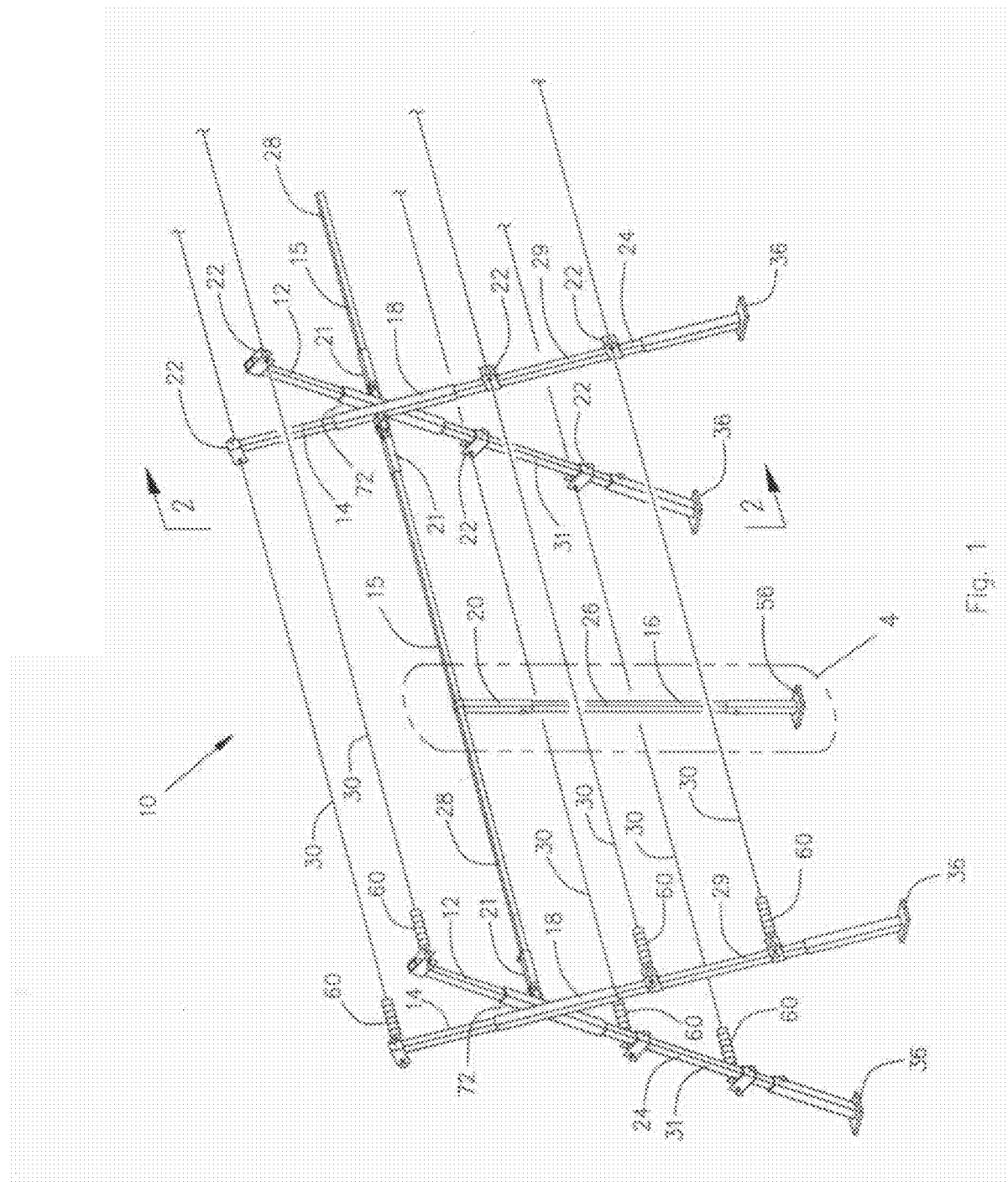

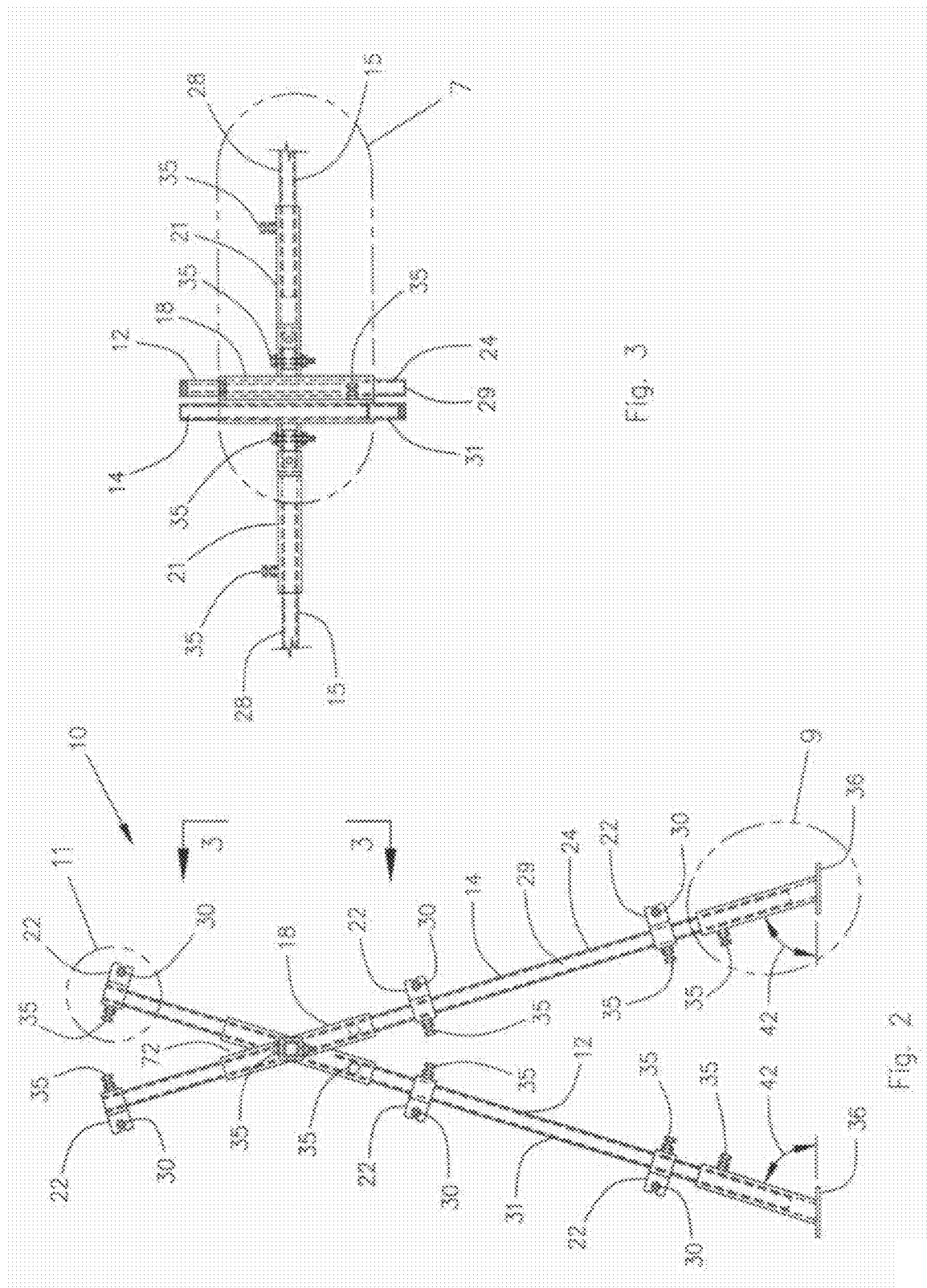

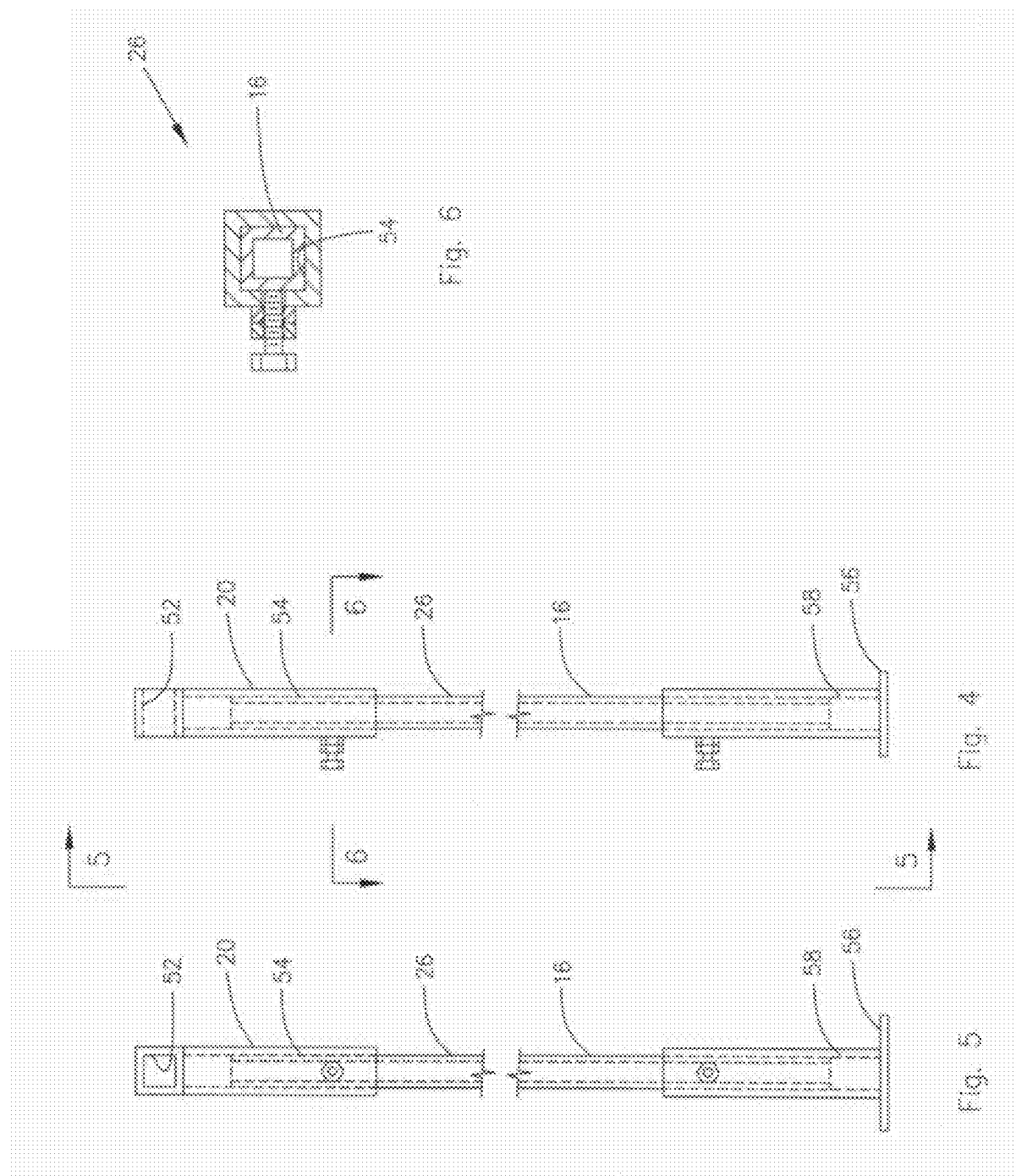

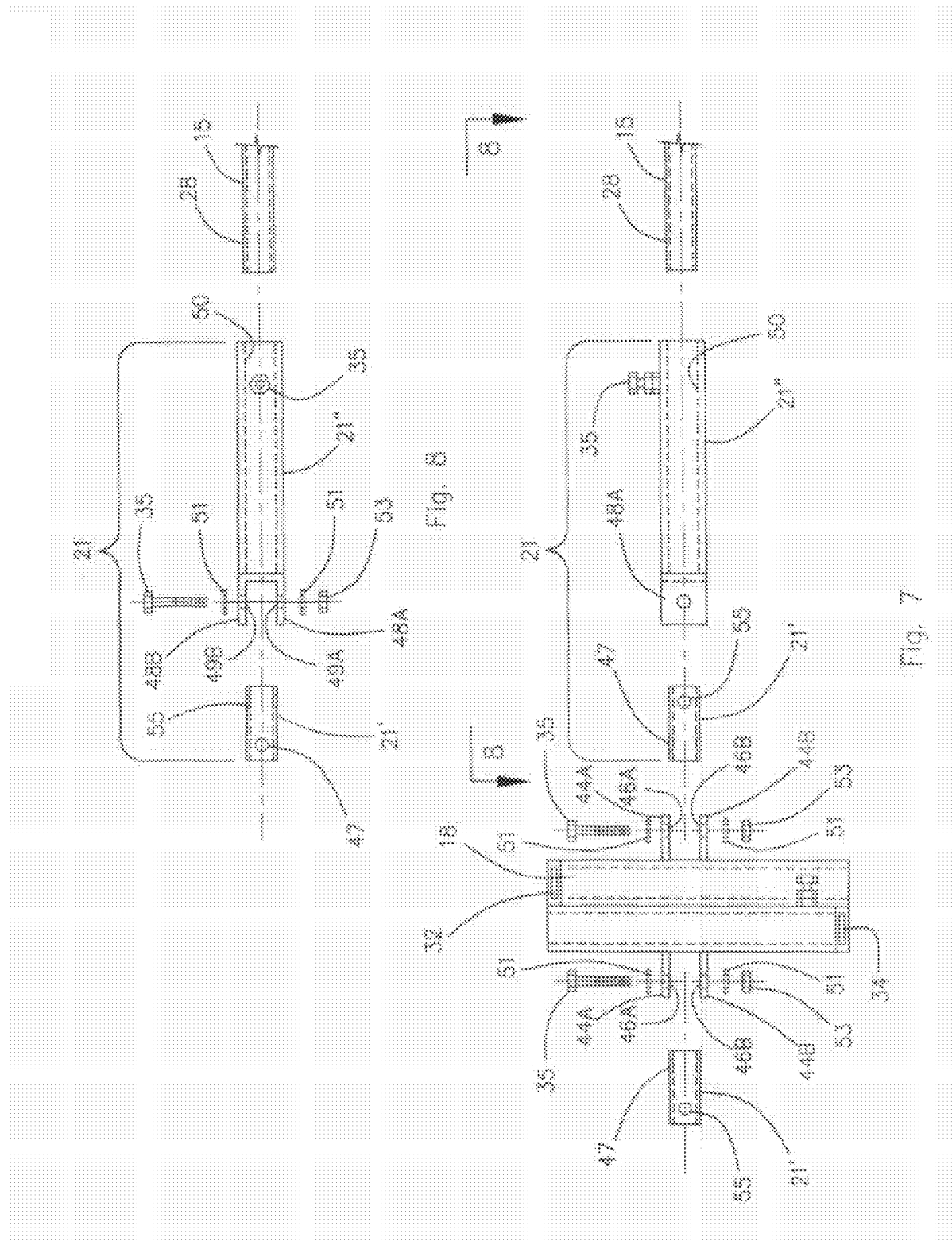

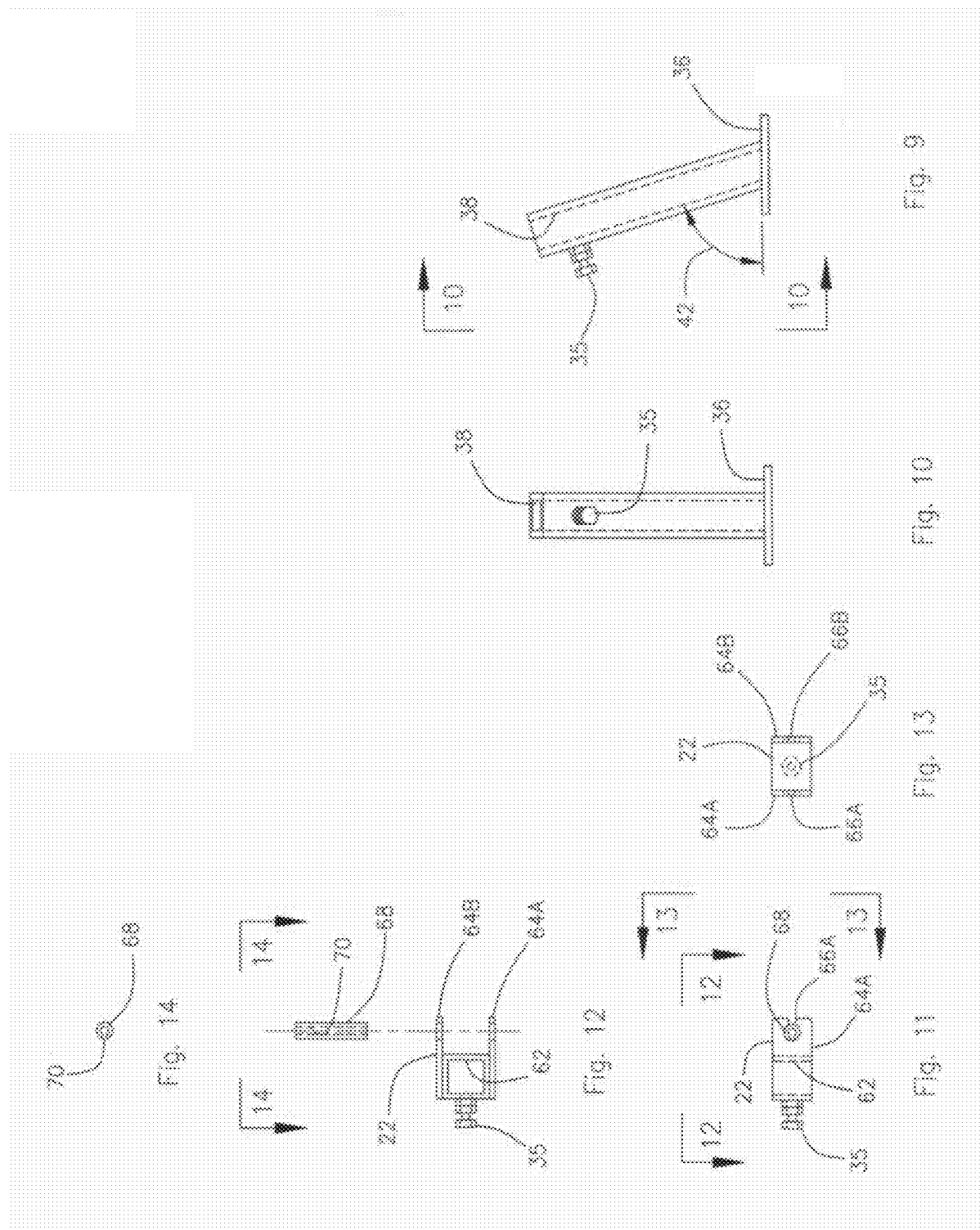

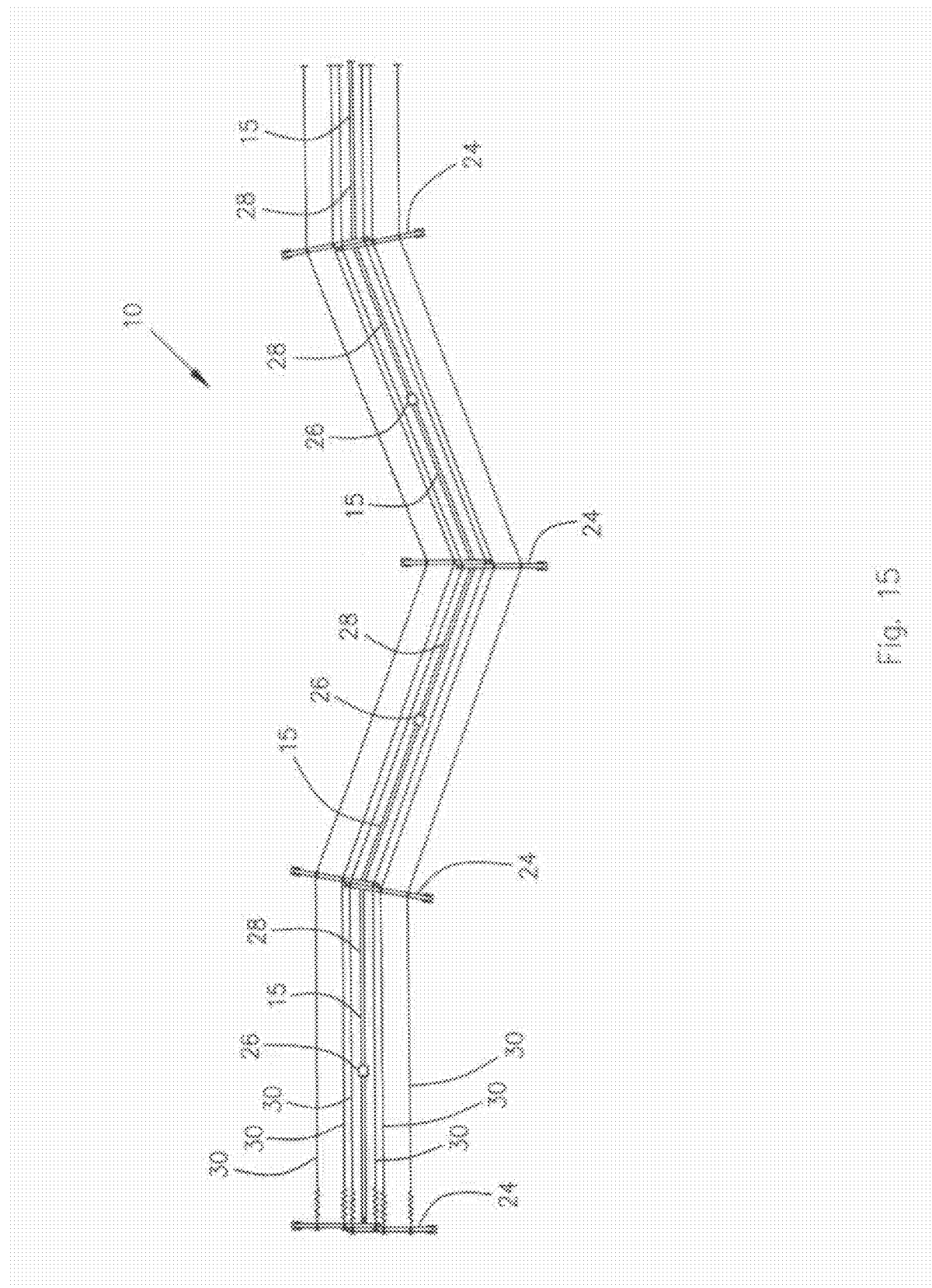

FREESTANDING FENCE

BACKGROUND OF THE INVENTION

1. Field of the Invention

The present invention relates to a freestanding fence that is supported on footed x-shaped posts. A horizontal member extends between adjacent x-shaped posts and a footed vertical support member is provided on each horizontal member approximately midway between the adjacent x-shaped posts to provide additional support for the fence. Several fence wires extend horizontally and connect adjacent x-shaped posts along the length of the fence.

2. Description of the Related Art

It is often desirable to construct a free standing fence that can later be moved and reused in a different location and used in a different configuration. Also, it would be desirable if the materials used to construct the fence where pieces that were easily transported using a pickup truck and could be assembled and disassembled using a few simple tools.

The present invention addresses these needs by providing a freestanding fence that does not require the digging of post holes and installing posts in the ground. Further the present invention is constructed of readily available square tubing and a few connectors that attach together to construct a fence that can be made in almost any configuration and installed on almost any terrain. Because the present invention is constructed in pieces, it can be disassembled, moved, reconfigured and reassembled multiple times without damage to the pieces.

Further, the present fence is not as likely to serve as a ground for lightening strikes as would a fence that had posts buried in the ground. This is particularly true if the feet of the present invention are pretreated with a non-conductive plastic coating.

Still further, with only slight modification, the horizontal members of the present fence can be used as a conduit for water so that the fence can additionally be used as a lawn sprinkler. And the horizontal members can be used as a conduit for security system wiring, fiber optics, electrical wiring, etc.

SUMMARY OF THE INVENTION

The present invention is a freestanding fence that is supported on x-shaped posts. Each leg of the x-shaped posts has a post foot on its lower end on which the post rests upon the top of the ground. A horizontal member extends between adjacent x-shaped posts and a vertical support member is provided on each horizontal member approximately midway between the adjacent x-shaped posts. Each vertical support member has a member foot on its lower end on which the vertical support member rests upon the top of the ground.

Several fence wires extend horizontally and connect adjacent x-shaped posts along the length of the fence. The fence wires are attached to the posts with a combination of traditional electrical insulators and with non-conductive wire fasteners so that the fence wires can be connected to an appropriate electrical source to convert the fence into an electric fence. The horizontal members can be used as a conduit for watering systems or security systems with only slight modifications to the tubing from which the horizontal members are constructed. And the x-shaped posts can be employed to support a water hose in the upwardly extending valley of the posts by simply laying a water hose on top of the posts.

The horizontal members are attached to the posts by means of couplings that allow for both vertical and horizontal adjustment thereby allowing the fence to be arranged in straight, irregular, or curved arrangements when viewed from above and can be used on hilly or rough terrain where it would be difficult to install traditional fence posts in the ground.

The freestanding fence is constructed of easily assembled pieces which require only the use of a couple of wrenches to assemble. This allows a homeowner to easily transport the materials needed to construct the fence in the back of a pickup truck. And because the fence is constructed in pieces, it can be disassembled, moved, and then reassembled as often as needed.

BRIEF DESCRIPTION OF THE DRAWINGS

FIG. 1 is a perspective view of a freestanding fence constructed in accordance with a preferred embodiment of the present invention.

FIG. 2 is an end view taken along line 2-2 of FIG. 1.

FIG. 3 is a side view taken along line 3-3 of FIG. 2.

FIG. 4 is an enlarged side view of a vertical support member shown within the circled area associated with numeral 4 of FIG. 1.

FIG. 5 is an end view taken along line 5-5 of FIG. 4.

FIG. 6 is an enlarged cross sectional view taken along line 6-6 of FIG. 4.

FIG. 7 is an enlarged side view of the coupling shown within the circled area associated with numeral 7 of FIG. 3.

FIG. 8 is a top plan view taken along line 8-8 of FIG. 7.

FIG. 9 is an enlarged end view of the post foot shown within the circled area associated with numeral 9 in FIG. 2.

FIG. 10 is a side view of the post foot taken along line 10-10 of FIG. 9.

FIG. 11 is an enlarged end view of a non-conductive wire fastener shown within the circled area associated with numeral 11 in FIG. 2.

FIG. 12 is an exploded top plan view taken along line 12-12 of FIG. 11.

FIG. 13 is a side view taken along line 13-13 of FIG. 11.

FIG. 14 is an end view of the non-conductive sleeve of the wire fastener taken along line 14-14 of FIG. 12.

FIG. 15 is a top view of a freestanding fence constructed in accordance with a preferred embodiment of the present invention illustrating that the fence can be constructed with odd angles and curves.

DETAILED DESCRIPTION OF THE PREFERRED EMBODIMENT

Referring now to drawings and initially to FIG. 1, there is illustrated a freestanding fence 10 constructed in accordance with a preferred embodiment of the present invention. The fence 10 is generally constructed of pieces of square tubing 12, 14, 15, and 16 connected together by means of two types of connectors 18, 20, one type of coupling 21, and one type of fastener 22 to form vertically oriented x-shaped posts 24 and support members 26 that are connected together by horizontal members 28 and fence wire 30, as will be more fully described hereafter.

As best seen in FIGS. 2 and 3, each x-shaped post 24 is constructed of two pieces of square tubing 12 and 14 that are held together in a criss-cross orientation by a hollow x-shaped connector 18 so that the two pieces of square tubing 12 and 14 form the two legs 29 and 31 of the x-shaped posts 24. As shown in FIG. 7, each x-shaped connector 18 is provided with a pair of hollow sleeves 32 and 34 for receiving the two pieces of square tubing 12 and 14. A threaded bolt 35 extends through the wall of each sleeve 32 and 34 of the connector 18 to engage its associated piece of square tubing 12 or 14 as a means of securing the square tubing 12 or 14 within the x-shaped connector 18 and thus securing the two legs 29 and 31 of the x-shaped post 24 together.

Referring to FIGS. 2 and 9, each leg 29 and 31 of an x-shaped post 24 has a post foot 36 secured on its lower end. Each post foot 36 is provided with a hollow sleeve 38 and the lower end of the leg 29 or 31 is received within the hollow sleeve 38 and secured therein by means of another threaded bolt 35 that extends through the wall of the sleeve 38 to engage its associated leg 29 or 31. The posts 24 rest on their post feet 36 upon the top of the ground. As shown in the FIGS. 2 and 9, the post feet 36 on the x-shaped posts 24 are at an acute angle 42 relative to the legs 29 and 31 of the posts 24 so that the post feet 36 will lay flat on the ground. This is necessary since the legs 29 and 31 of the x-shaped posts 24 are oriented at an acute angle 42 to the ground in the completed fence 10.

As illustrated in FIG. 7, the x-shaped connector 18 is provided with a pair of ears 44A and 44B on either end of the connector 18. The ears 44A and 44B of each pair are provided with bolt openings 46A and 46B therethrough which align vertically with a first bolt opening 47 provided in a first portion 21' of the coupling 21 and receive a threaded bolt 35 therethrough as a means of securing a first portion 21' of a coupling 21 to the x-shaped posts 24. The bolt 35 is held in place by washers 51 and a nut 53. As shown in FIG. 8, the first portion 21' of the coupling 21 attaches on an opposite end to another pair of ears 48A and 48B provided on a second portion 21" of the coupling 21 that are oriented at 90 degrees from the pair of ears 44A and 44B provided on the x-shaped connector 18. The second pair of ears 48A and 48B are also provided with a pair of bolt openings 49A and 49B therethrough which align horizontally with a second bolt opening 55 provided in the first portion 21' of the coupling 21 and receive a threaded bolt 35 therethrough as a means of securing the first and second portions 21' and 21" of the coupling 21 together. The threaded bolt 35 is held in place with washers 51 and a nut 53.

By the ears 44A and 44B being oriented 90 degrees from the ears 48A and 48B, the coupling 21 allows for both vertical and horizontal adjustment of the angle of attachment of the horizontal members 28 to the x-shaped posts 24. An opposite end of the second portion 21" of the coupling 21 is provided with a hollow sleeve 50 designed to receive therein one end of the piece of square tubing 15 that forms the horizontal member 28. The square tubing 15 of the horizontal member 28 is secured within the hollow sleeve 50 of the second portion 21" of the coupling 21 by means of a threaded bolt 35 that extends through the wall of the second portion 21" of the coupling 21 to engage the square tubing 15 of the horizontal member 28. Additional horizontal members 28 extend between adjacent x-shaped posts 24 and are likewise secured on their opposite ends to the x-shaped posts 24 by additional couplings 21 and x-shaped connectors 18.

Because the couplings 21 that connect the horizontal members 28 to the posts 24 allow for horizontal adjustment, this enables the fence 10 to be arranged in straight, irregular, or curved arrangements when viewed from above, as illustrated in FIG. 15. And because the couplings 21 that connect the horizontal members 28 to the posts 24 also allow for vertical adjustment, this enables the fence 10 to be used on hilly or rough terrain where it would be difficult to install traditional fence posts in the ground.

Referring to FIGS. 1, 4, 5, and 6, a vertical support member 26 is provided on each horizontal member 28 approximately midway between the adjacent x-shaped posts 24 to provide additional support for the fence 10. The vertical support member 26 has a top connector 20 that has a first hollow sleeve 52 for receiving therethrough the piece of square tubing 15 that forms the horizontal member 28. The top connector 20 is also provided with a second hollow sleeve 54 at approximately a 90 degree angle from the first sleeve 52 for receiving the piece of square tubing 16 that forms the vertical support member 26. The square tubing 16 is secured within the second sleeve 54 by means of a threaded bolt 35 that extends through the wall of the second sleeve 54 to engage the square tubing 16 of the vertical support member 26.

Each vertical support member 26 has a member foot 56 on its lower end on which the vertical support member 26 rests upon the top of the ground. Each member foot 56 has a hollow sleeve 58 for receiving the lower end of the square tubing 16 that forms the vertical support member 26, and the square tubing 16 is secured within the sleeve 58 of its associated member foot 56 by means of a threaded bolt 35 that extends through the wall of the member foot's sleeve 58 and engages the square tubing 16. As shown in FIGS. 1, 4 and 5, the member 56 provided on the vertical support members 26 are preferably at approximately a 90 degree angle relative to their associated vertical support members 26 so that the member feet 56 rest on the ground and hold the vertical support members 26 vertically above the ground.

Referring again to FIG. 1, several fence wires 30 extend horizontally and connect to adjacent x-shaped posts 24 along the length of the fence 10. The fence wires 30 are attached to the fence posts 24 by a combination of traditional electrical insulators 60 and with non-conductive fasteners 22 so that the fence wires 30 can be connected to an appropriate electrical source (not illustrated) to convert the fence 10 into an electric fence.

The non-conductive fasteners 22 are shown in detail in FIGS. 11-14. Each of these non-conductive fasteners 22 is provided with a hollow sleeve 62 with a threaded bolt 35 for securing the fastener 22 to a leg 29 or 31 of the x-shaped posts 24 by first inserting the leg 29 or 31 through the hollow sleeve 62 and then causing the threaded bolt 35 to engage the leg 29 or 31 to hold the fastener 22 on the leg 29 or 31. Each non-conductive fastener 22 is provided with a pair of ears 64A and 64B that have horizontally aligned slots 66A and 66B for receiving a hollow non-conductive sleeve 68. Each non-conductive sleeve 68 is provided with a longitudinal slit 70 therein so that the non-conductive sleeve 68 can be slipped over a fence wire 30 and then inserted into the aligned slots 66A and 66B in the pair of ears 64A and 64B provided on the fastener 22. The longitudinal slit 70 is preferably inserted into the slots 66A and 66B first so that the wire 30 is captured within the slots 66A and 66B and held inside the hollow non-conductive sleeve 68.

As described and illustrated, the freestanding fence 10 is constructed of easily assembled pieces of tubing 12, 14, 15, and 16 and post feet 36 and member feet 56 secured together with connectors 18 and 20, couplings 21, fasteners 22, and fence wire 30 which require only the use of a couple of wrenches to assemble. This allows a homeowner to easily transport the materials needed to construct the fence 10 in the back of a pickup truck. And because the fence 10 is constructed in pieces, it can be disassembled, moved, and then reassembled as often as needed.

Although not illustrated, the feet 36 and 56 can be pretreated with an electrically non-conductive coating to make the fence 10 even less likely to serve as an electrical ground for lightening strikes, making the fenced area safer for livestock that generally tend to congregate at the fence when a storm approaches.

Further, although not specifically illustrated, by making only slight modifications to the horizontal members 28, such as sealing both ends of the hollow pieces of square tubing 15 forming the horizontal members 28 and adding water nozzles at both ends, the horizontal members 28 of the present fence 10 can be used as a conduit for water. By also adding sprinkler heads, the fence 10 can additionally be used as a lawn sprinkler system. And with similar minor modifications, the horizontal members 28 can be used as conduit for security system wiring, fiber optics, electrical wiring, etc.

And as shown in FIGS. 1 and 2 the upper portion of each x-shaped connector 18 and posts 24 form a valley 72 that opens upward. Without any modifications to the fence 10, these valleys 72 can be employed to support a water hose (not illustrated) or other similar items off of the ground by laying the items on top of the x-shaped connector 18.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A freestanding fence comprising:
    a plurality of freestanding, electrically conductive x-shaped posts, each said x-shaped post constructed of two straight tubular post legs that are secured together in side-by-side arrangement so that the two post legs are offset from one another, said x-shaped posts constructed of electrically conductive material, a horizontally disposed post foot provided at a lower end of each leg of the x-shaped posts which rest on top of the ground without inserting into the ground, at least one rigid tubular horizontal member attached between adjacent x-shaped posts by means of vertically adjustable and horizontally adjustable couplings to secure the x-shaped posts of a freestanding fence together so that an individual x-shaped post cannot be turned over without turning over all of the attached x-shaped posts of the freestanding fence, electrically charged fence wire attached horizontally in an electrically isolating manner to adjacent x-shaped posts to form the freestanding fence so that the electrically conductive x-shaped posts are not electrically energized by the electrically charged fence wire, an x-shaped connector holding the two legs of each x-shaped post together in crossed orientation to each other so that the two legs of each x-shaped post are offset from one another,
    upper and lower ears provided on each x-shaped connector for adjustably attaching a first portion of at least one of said adjustable couplings to the x-shaped post, each of said ears provided with a bolt opening therethrough so that the bolt openings in the ears are vertically aligned, a first end of said first portion of the adjustable coupling provided with a first bolt opening extending therethrough, a bolt extending consecutively through a first aligned bolt opening in the ears and then through the first bolt opening in the first portion of the adjustable coupling and finally through a second aligned bolt opening in the ears to pivotally attach the first portion of the coupling to the x-shaped connector so that the first portion of the x-shaped connector can be pivoted in a horizontal plane.

2. The freestanding fence according to claim 1 further comprising:
    the first portion of the adjustable coupling adjustably attaching to a second portion of the adjustable coupling, a second end of said first portion of the adjustable coupling provided with a second bolt opening extending therethrough so that the second bolt opening is approximately perpendicular to the first bolt opening provided in the first end of the first portion of the adjustable coupling, a first end of the second portion of the adjustable coupling provided with upper and lower coupling lips and each coupling lip provided with a bolt opening therethrough so that the bolt openings in the pair of coupling lips are vertically aligned, a bolt extending consecutively through one of the aligned bolt openings in the coupling lips and then through the second bolt opening in the first portion of the adjustable coupling and finally through the other aligned bolt opening in the coupling lip to pivotally attaching the first portion of the coupling to the second portion of the coupling so that the first portion of the coupling can be pivoted in a vertical plane relative to the second portion of the coupling, and a second end of the second portion of the coupling attached to an end of one of said horizontal members.

3. A freestanding fence comprising:
    a plurality of freestanding, electrically conductive x-shaped posts, each said x-shaped post constructed of two straight tubular post legs that are secured together in side-by-side arrangement so that the two post legs are offset from one another, said x-shaped posts constructed of electrically conductive material, a horizontally disposed post foot provided at a lower end of each leg of the x-shaped posts which rest on top of the ground without inserting into the ground, at least one rigid tubular horizontal member attached between adjacent x-shaped posts by means of vertically adjustable and horizontally adjustable couplings to secure the x-shaped posts of a freestanding fence together so that an individual x-shaped post cannot be turned over without turning over all of the attached x-shaped posts of the freestanding fence, at least one electrically charged fence wire attached horizontally in an electrically isolating manner to adjacent x-shaped posts to form the freestanding fence so that the electrically conductive x-shaped posts are not electrically energized by the electrically charged fence wire,
    non-conductive fasteners attaching the fence wire to the x-shaped posts as a means of electrically isolating the electrically charged fence wire from the x-shaped posts of the freestanding fence so that the electrically conductive x-shaped posts are not electrically energized by the electrically charged fence wire, and
    hollow sleeves of electrical insulating material encircling the fence wire, said hollow sleeves held in place with non-conductive fasteners that secure the hollow sleeves and fence wire to the x-shaped posts, and each said hollow sleeve provided with a longitudinal slit therethrough so that the sleeve can be slipped around the fence wire.

* * * * *